Sept. 19, 1967      H. E. TREKELL      3,342,072
PRESSURE-MEASURING DEVICE
Filed April 28, 1965
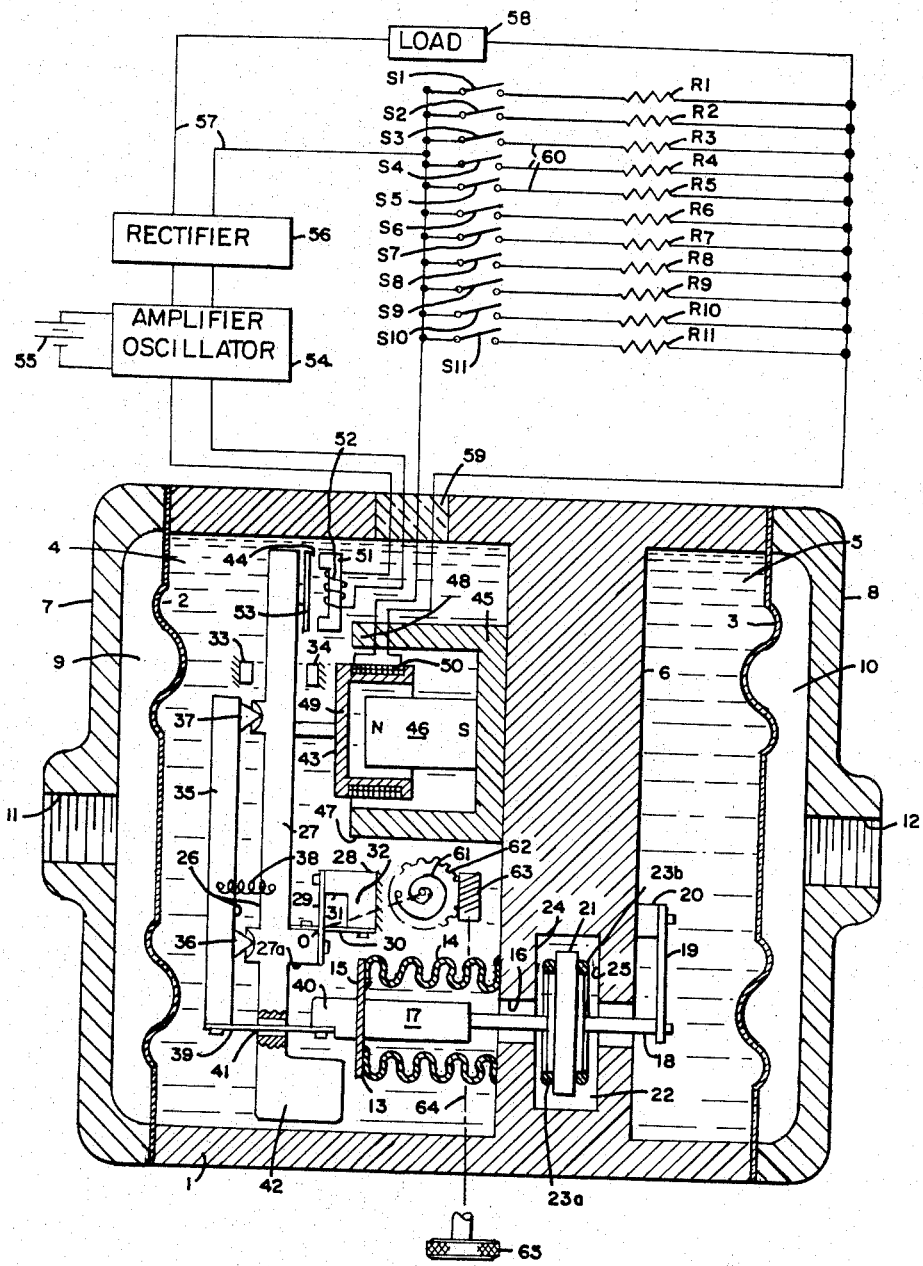
INVENTOR
HAROLD E. TREKELL
BY, *Richard E. Hesley*
ATTORNEY

United States Patent Office 3,342,072
Patented Sept. 19, 1967

3,342,072
PRESSURE-MEASURING DEVICE
Harold E. Trekell, Wakefield, Mass., assignor to General
Electric Company, a corporation of New York
Filed Apr. 28, 1965, Ser. No. 451,547
12 Claims. (Cl. 73—398)

ABSTRACT OF THE DISCLOSURE

A differential pressure transducer. Pressure applied to two spaced diaphragms is hydraulically transmitted to a force balance system by oil and a pressure-sensitive bellows. All mechanical elements are immersed in one oil-filled chamber. Span adjustment is provided by calibrated resistors switchably shunting the force motor of the force balance system.

Background of the invention

The present invention relates to pressure-measuring devices and more particularly to a pressure-measuring device of the force balance type that produces an output signal variable in accordance with the magnitude of the input pressure or pressures for indication, recording, or control purposes. While the invention has general application, it is particularly useful in differential pressure-measuring devices used in measuring or controlling pressure differentials.

Differential pressure-measuring devices are frequently used to measure the difference between upstream and downstream pressures across an orifice in a fluid conduit for flow measurement or flow control purposes. These devices pose difficult design problems especially when the fluid conduit operates under high pressure. In some cases the fluid pressure may run as high as 2,000 p.s.i. while the pressure differential to be measured may be only a few p.s.i. For such applications the pressure-measuring device must be sufficiently rugged to withstand the high line pressure and yet sufficiently sensitive to measure the relatively low pressure differentials involved. Furthermore, provision must be made to protect the pressure-sensitive element of the device from damage in the event that pressure is lost in one of the input lines as by inadvertent disconnection. In present commercial designs, it is common practice to enclose the differential pressure-sensitive element in a pressure housing of rugged construction to withstand the high line pressure and mechanically transmit the motion or force of the pressure-sensitive element to pressure-measuring apparatus located outside the pressure housing through a torque tube or other flexible seal arrangement. Such designs are bulky, heavy, and awkward to handle. Furthermore, the mechanical linkages involved introduce a substantial amount of friction in the measuring system which impairs measurement accuracy, especially in cases where small pressure differentials are to be measured. Also, there are difficult problems in the design of the pressure seal to transmit mechanical motion outside the pressure casing.

Accordingly, it is an object of the present invention to provide an improved pressure-measuring device which does not require the transmission of mechanical force or motion outside the pressure housing for pressure-measurement purposes.

A further object of the invention is to provide a differential pressure-measuring device which protects the pressure-sensitive element from inadvertent overpressure while providing accurate force balance measurement of differential pressures in the normal measurement pressure range.

Another object of the invention is to provide an improved pressure-measuring device having an electrical output signal with provision for a convenient electrical adjustment of the measured input pressure span of the device.

A still further object of the invention is to provide a pressure-measuring device which is more compact, has fewer parts, and has a high degree of accuracy and repeatability in the performance of its measurement function.

Further objects and advantages of the invention will become apparent as the following description proceeds.

Summary

Briefly, in accordance with the present invention, the pressure-measuring device comprises a pressure housing having two liquid-filled chambers separated by a rigid partition, each chamber being enclosed on one side by a flexible isolating diaphragm exposed to an input pressure to be measured.

A flexible pressure-sensitive element is arranged to have opposite sides exposed to the liquid pressures in the two chambers whereby it experiences a force proportional to the differential pressures in the chambers, which pressures are transmitted thereto by hydraulic forces proportional to the measured input pressures.

The force exerted on the pressure-sensitive element is measured by a force balance measuring system, the moving parts of which are located in one of the liquid-filled chambers, thereby obviating the need for transmitting mechanical motion or force outside the casing. The liquid in which the force-measuring apparatus is immersed performs the dual functions of transmitting the measured pressure hydraulically to the pressure-sensitive element and damping the mechanical movements of the force balance measuring apparatus to improve its dynamic response and prevent oscillation of the servo mechanism which actuates the force balance system.

The force balance measuring system has an electromagnetic force motor to which an electrical current is supplied by a motor-energizing circuit controlled by a position detector arranged to sense the position of the force balance mechanism which is balanced by the force motor. The current supplied to the motor-energizing circuit, which is proportional to the pressure being measured, is used as an output signal which is led outside the pressure housing through electric circuit connections. In order to adjust the input pressure span of the measuring device, a plurality of switch-controlled bypass circuits are provided which act to bypass around the force motor predetermined amounts of current in the motor-energizing circuit.

As a further feature of the invention to prevent damage to the pressure-sensitive element, an overload valve is provided which automatically closes to isolate the pressure-sensitive element in the event of overpressure, this action being accomplished by overpowering the force balance mechanism without sacrificing measurement accuracy when the pressure-sensitive element is exposed to the normal range of measurement pressures.

Brief description of the drawing

For a more complete understanding of the present invention, reference should now be made to the following detailed description taken in connection with the accompanying drawing in which the single figure is a cross-sectional schematic view of a differential pressure-measuring device which embodies the invention.

Description of the preferred embodiment

Referring now to the drawing, the pressure-measuring device constructed in accordance with the invention is shown as comprising a hollow pressure casing or housing 1 of sufficiently rugged construction to withstand the fluid pressures to which the device is exposed. Mounted within the housing are two isolating diaphragms 2 and 3 the insides of which define with the pressure housing a liquid-tight space. This space is divided into two pressure chambers 4 and 5 by a rigid partition 6 and contains a suitable fill fluid preferably having dielectric properties, such as transformer or silicone oil. The isolating diaphragms 2 and 3 are enclosed by end plates 7 and 8 defining, with the isolating diaphragms, fluid chambers 9 and 10 which are connected to pressures to be measured by inlet conduits 11 and 12. With this arrangement it will be apparent that the liquid in chamber 4 is subjected to a hydraulic pressure variable in accordance with the fluid pressure in chamber 9 and inlet conduit 11 which is exerted against the flexible isolating diaphragm 2. Similarly, the liquid in chamber 5 is subjected to a hydraulic pressure variable in accordance with the pressure in chamber 10 and inlet conduit 12 exerted through the flexible isolating diaphragm 3. Thus, the pressures in chambers 4 and 5 are dependent upon the inlet pressures being measured by the pressure-measuring device.

Mounted within the pressure chamber 4 is a flexible pressure-sensitive element 13 arranged to be exposed on opposite sides to the fluid pressures in chambers 4 and 5 so that it experiences a displacement force proportional to the pressure difference in the chambers 4 and 5. As shown, the flexible pressure-sensitive element consists of a flexible bellows 14, one end of which is closed and sealed by a rigid head 15. The other end of the bellows is sealed to the partition 6 in any suitable manner, as by welding. The interior of the bellows 14 is connected to the pressure chamber 5 by means of a conduit 16 passing through the partition 6. In order to guide the bellows for horizontal translating movement in response to measured pressure differentials, there is provided a stem 17 one end of which is rigidly attached to the inside of head 15, the other end being provided with a shaft 18 projecting through the liquid conduit 16 in spaced relation therewith in order to permit flow of fluid between the interior of the bellows and the pressure chamber 5 through the space between the shaft and the outer confines of the liquid conduit 16. The outer end of shaft 18, which is shown as projecting into the pressure chamber 5, is supported by means of a spring finger 19. As shown, one end of the finger 19 is rigidly connected to the partition 6 through a boss 20 while the free end of the finger is attached to the right end of shaft 18. The flexing movement of the spring finger 19 permits axial translation of the shaft 18 but prohibits lateral movement thereof.

For the purpose of isolating the bellows 14 in the event of excessive pressure differential in the chambers 4 and 5 that would otherwise collapse and damage the bellows, there is provided an overload or overpressure valve 21 rigidly mounted on shaft 18 so as to normally occupy a central position in a valve chamber 22 shown as being formed by a central enlargement of the conduit 16. Located on opposite sides of the valve 21 are O-ring seals 23a and 23b adapted to engage, respectively, valve seats 24 and 25 upon deflection of the bellows 14 and shaft 18 to the left or right in response to an overpressure condition. This action occurs automatically to protect the bellows as will be further described.

As pointed out above, the pressure exerted on the bellows 14 tending to cause translation thereof is proportional to the differential of the pressures in chambers 4 and 5. For the purpose of measuring this differential pressure force and providing an electrical output signal variable in accordance with such force, there is provided a force balance measuring system mounted within the liquid chamber 4 the structural features of which will now be described.

The force balance measuring system is shown as comprising pivotally mounted lever system 26 comprising a first lever 27 which is pivotally mounted for rotation about an axis O on a fixed support 28. In the mounting arrangement shown, the pivotal action of the lever 27 is accomplished by the use of a pair of mutually perpendicular flexures 29 and 30 extending between a boss 27a on lever 27 and perpendicular extensions 31 and 32 of the support 28. Rotational movement of the lever 27 is limited with respect to the normal balanced position shown by means of a pair of spaced fixed stops 33 and 34. The lever system 26 is connected to the bellows 14 which exerts thereon a torque or moment tending to rotate the lever in response to translating movements of the bellows. This connection is made by a special arrangement designed to permit axial movement of the bellows beyond the range permitted by stops 33 and 34 during overpressure conditions. This is accomplished by means of a second lever 35 mounted in juxtaposed relationship with the lever 27 by means of a pair of spaced fulcrums 36 and 37 arranged to provide pivotal movement of the lever 35 independently of the lever 27. Under normal pressure conditions this pivotal movement is prevented by yielding means arranged to urge the levers together and thereby prevent pivotal movement of lever 35 about either of the fulcrums 36 and 37. In the illustrated arrangement, this yielding means is shown as a tension spring 38 the ends of which are secured to the levers 35 and 27 so as to draw them together. The left end of the lever 35, which is displaced from the rotational axis O of the lever system 26, is connected to the bellows 14 by means of a connecting strap 39 extending between the end of the lever 35 and a shaft extension 40 secured to and projecting from the outside of the bellows head 15. The strap 39 is shown as projecting through a hole 41 in the lever 27 the end of which has a section enlarged so as to form a counterweight 42. Entire lever system 26 is balanced so as to be insensitive to shock and vibration forces that might otherwise tend to caues rotation of the lever system.

In order to maintain the lever system 26 in a state of balance and provide means for measuring the differential pressure force applied thereto by bellows 14, there is provided a servo-motor mechanism comprising a force motor 43, a position detector 44, and associated electrical apparatus the operation of which will now be described.

The force motor 43 is an electromagnetic motor comprising a cylindrical core structure 45 supported in the chamber 4 on the partition 6. The core structure supports a cylindrical permanent magnet 46 polarized along its length, as shown, so as to provide a radial magnetic flux extending between the magnet and the oppositely disposed pole pieces 47 and 48 which lie in spaced relation with the magnet. The motor has a movable armature 49 carrying an annular winding 50 disposed in the path of the radial flux provided by the magnet 46. When unidirectional electric current is supplied to the winding 50, the magnetic force produced by the winding and the permanent magnet 46 acts so as to draw the armature downward toward the permanent magnet with a force proportional to the armature current. The armature is connected to the lever 27 at a point displaced from the rotational axis O of the lever so that when the force motor armature is energized, a torque or moment is applied to the lever which counterbalances the torque applied thereto by the pressure-sensitive element 13. The amount of current supplied to the force motor is controlled by the position detector 44, the movable part of which is mounted on the lever 27 so as to sense the position of the lever. While different types of position detectors may be used, the variable inductance type illustrated comprises a stationary U-shaped core 51 carrying a winding 52 the inductance of which is varied by the position of an armature 53 formed of ferrite or other similar material, the movable armature being connected to and positioned by the lever 27. When the position of the armature 53 of the position detector is changed, as by movement of the lever 27, the resulting change in inductance of the coil 52 changes the amplitude of oscillation of an oscillator 54 to which it is connected in a known manner, the oscillator and an associated amplifier being energized by a suitable power supply 55. The amplified output of the oscillator 54 is fed to a rectifier 56 of known construction, the direct current output of which is connected to a motor-energizing circuit 57 which supplies current to the series-connected armature coil 50 of the force motor 43. As shown in the drawing, the motor-energizing circuit includes in series-circuit relation with the output of the rectifier 56 a load device 58 and the armature winding 50 of the force motor, the current in the circuit being proportional to the force exerted on lever system 26 by the force motor. When the lever system is in a state of balance, this force is directly related to the differential pressure force exerted by the pressure-sensitive element 13 so that the current in the circuit is directly proportional to the differential pressure being measured and becomes an indication of that quantity. Since the same current flows through the load device 58, it, too, is actuated in accordance with the measured pressure differential. The load device 58 may be an electric current meter to indicate the measured differential pressure, or it may be the actuating element of a recorder or a control device used to control the differential pressure being measured. It will be understood that any differential pressure change as indicated by a change in the force exerted on the lever system 26 by the bellows 14 will cause a movement of the armature 44 of the position detector, which, in turn, changes the current supplied to the force motor in a proper direction to restore the lever system to a state of balance. In actual practice the motion of the lever 27 in the normal operating range is quite small, for example, something of the order of 0.001 inch. To make this possible, the position detector must be sufficiently sensitive to move through its complete range of current control of the force motor with a relatively small displacement of the armature. In effect, the position detector and the force motor are the active components of a servo mechanism which operates with high sensitivity to maintain the lever system 26 in a state of balance, and in so doing, provides a continuous indication of the measured pressure differential as indicated by the current flowing in the force motor circuit. Any tendency of this servo system to oscillate because of its high sensitivity is effectively damped by the fill fluid in the chamber 4 in which the moving parts of the force balance mechanism are immersed. Thus, in the arrangement described, the fill fluid in the chamber 4 performs the dual function of transmitting pressure in the chamber 4 to the pressure-sensitive element 13 and further acts to damp the motions of the servo mechanism forming the actuating part of the force balance mechanism. In this way the construction of the pressure-measuring device is simplified and reduced in size. Also, it is to be noted that all the moving parts of the force balance mechanism are enclosed within the pressure housing 1, the measured pressures being in the form of an electric signal conducted outside the housing for indication and control purposes by electric circuit connections which can be easily pressure sealed as by use of a hermetic seal 59.

In pressure-measuring devices of the type thus far described, it is desirable to have a means for adjusting the input pressure span of the device. The input pressure span is represented by the ratio $$\frac{P_1-P_2}{I_1-I_2}$$

where $P_1$ and $P_2$ are the two input pressures the differential of which is to be measured and $I_1$ and $I_2$ are the two current values in the load device 58 corresponding to the maximum and minimum current values supplied to the force motor energizing circuit over the measured pressure range.

Convenient electrical adjustment of the input pressure span is provided by a series of bypass circuits 60 connected, as shown, in parallel with the armature winding 50 of the force motor. Each of these bypass circuits comprises a control switch S and a calibrated resistor R. As illustrated in the drawing, eleven of these bypass circuits are shown, these circuits being controlled, respectively, by the switches $S_1$–$S_{11}$, inclusive, the circuits including corresponding calibrating resistors $R_1$–$R_{11}$, inclusive. The values of the resistors R are selected such that the desired amount of current to be bypassed around the force motor with a consequent change in the input span range may be set by closing selected ones of the switches S either individually or in combination.

In order to minimize the number of bypass circuits required to give a desired number of span adjustments, the resistance and related conductance values of the resistors R are preferably selected so that they have a binary relationship. An understanding of this arrangement will be facilitated by a concrete example which is set forth below. In the following Table 1 will be found the resistance and related conductance values of the eleven bypass circuit resistors as might be used in a case where the resistance of the armature winding 50 is 50 ohms corresponding to 448 conductance units.

TABLE 1

| Shunt Resistor No. | Resistance (Ohms) | Conductance Units |
|---|---|---|
| 1 | 21.5 | 1,024 |
| 2 | 43 | 512 |
| 3 | 86 | 256 |
| 4 | 172 | 128 |
| 5 | 344 | 64 |
| 6 | 688 | 32 |
| 7 | 1,376 | 16 |
| 8 | 2,752 | 8 |
| 9 | 5,504 | 4 |
| 10 | 11,008 | 2 |
| 11 | 22,016 | 1 |

With the resistance and conductance values of the resistors $R_1$–$R_{11}$ shown above in Table 1, the instrument is then calibrated to show the relationship between the percent input pressure span and the conductance required as expressed by the formula:

$$\text{Percent span} = k\frac{100a_1}{a_1+a_2}$$

where $a_1$ is the conductance of coil 50 (448 units, $a_2$ is the total shunt conductance, and $k$ is a proportionality constant. A typical relationship is shown by the following Table 2 for a case where $k=1.05$:

TABLE 2

| Percent span: | Conductance units required |
|---|---|
| 100 | 22 |
| 90 | 75 |
| 80 | 140 |
| 70 | 224 |
| 60 | 336 |
| 50 | 493 |
| 40 | 728 |
| 30 | 1120 |
| 20 | 1904 |

With the above calibration data at hand, the pressure-measuring device is adjusted to obtain the required input pressure span by closing the appropriate switches S in the bypass circuits 60 to obtain the required total number of conductance units. For example, if 100% span is to be set, the required number of 22 conductance units is obtained by closing switches 7, 9, and 10 giving 16+4+2=22 conductance units, the remaining switches S being left open. Similarly, 50% span is obtained by closing switches 3, 4, 5, 6, 8, 9 and 11 giving $$256+128+64+32+8+4+1=493$$

conductance units. In a like manner 20% span is set by closing switches 1, 2, 3, 4, 5, 7, and 9 giving $$1024+512+256+128+64+16+4=1904$$

conductance units. Other span adjustments are obtained in a similar manner by closing selected switches S so the total conductance of the connected bypass circuits equals the proper value, as determined by the calibration data, to give the desired span adjustment. By selecting the resistance and conductance values of resistors R to have the binary relationship illustrated, the number of required bypass circuits is minimized.

To minimize the effect of ambient temperature variations on the calibration and hence accuracy of the pressure-measuring device, the resistors R and armature coil 50 of force motor 43 are preferably formed of materials having the same temperature coefficient of resistance, and to this end both may be formed of the same material such as copper. This tends to keep the distribution of resistance and hence current flow in the armature and the bypass circuits the same when an ambient temperature change causes a change in the resistance of resistors R and coil 50. Also, the resistors R and armature coil 50 are preferably maintained at the same temperature. To this end the resistors R may be encased and hence heat sunk in the portion of pressure housing 1 that encloses the fill fluid of chamber 4 in which the coil 50 is immersed.

In addition to the input pressure span adjustment, it is desirable to provide a zero set adjustment to provide the desired correlation between the minimum pressure differential to be measured and the minimum current supplied to load device 58. To accomplish this, an adjustable spiral spring 61 is provided. As illustrated schematically in the drawing, the inner end of the spiral spring is connected to lever 27 so as to apply a torque about the rotation axis O of the lever system 26. The outer end of the spring is pinned to a gear 62 which is rotatably positioned by a meshing worm gear 63 carried on a shaft 64 extending outside the housing 1 through a suitable seal (not shown) and terminating in a zero set knob 65. By turning knob 65, the torque applied to lever system 26 by spring 61 and the current supplied to load 58 and force motor 43 to maintain the lever system in a state of balance for a given input pressure condition may be adjusted.

Operation

The operation of the pressure-measuring device should now be clear. In use, the inlet connections 11 and 12 will be connected to pressure lines for the purpose of measuring the difference in the fluid pressures in such lines. They may, for example, be the pressure lines leading from the upstream and downstream sides of an orifice or venturi disposed in a conduit carrying process fluid the flow of which is to be measured or controlled.

Any difference in the pressure in inlet conduits 11 and 12 will cause corresponding differences of pressure in the liquid in chambers 4 and 5. The difference in these liquid pressures appears across the pressure-sensitive element 13 which experiences a force proportional to the pressure difference. This force is applied to the lever system 26, tending to cause rotation thereof. A counterbalancing force is applied to the lever system 26 by the force motor 43, and the magnitude of this force is controlled by the position detector 4 so as to maintain the lever system in a state of balance. The current supplied to the force motor is proportional to this counterbalancing force, which is, in turn, proportional to the differential pressure force exerted by the pressure-sensitive element 13. Hence, the magnitude of the motor current is an indication of the differential pressure being measured, and this current is used to actuate load device 58 which may be a meter, recorder, or a differential pressure control device. After adjusting the current in load 58 for the minimum differential pressure to be measured by rotating zero set knob 65, the pressure span of the device is selected by closing selected ones of the bypass circuit switches S as determined by reference to the calibration data such as that set forth in Tables 1 and 2 supra.

In the event of an overpressure condition exceeding the normal input pressure span being measured, the resulting force exerted on the pressure-sensitive element 13 will tilt lever 27 until it hits either stop 33 or 34 depending on the direction of the overpressure. If it is in a direction tending to collapse bellows 14, lever 27 will tilt counterclockwise until it engages stop 33. Thereafter, lever 35 will tilt counterclockwise about fulcrum 36 overpowering tension spring 38. This movement allows bellows 14 and valve 21 to move to the right, closing conduit 16 and trapping liquid in the bellows to prevent further collapse and damage to the bellows. If the overpressure is in a direction to expand the bellows, the lever 27 tilts clockwise until it engages stop 34. Thereafter, lever 35 will tilt clockwise about fulcrum 37, overpowering tension spring 38. This movement allows valve 21 to move to the left, closing conduit 16 to isolate the interior of the bellows from further pressure increase in chamber 5. When the pressure differential across the pressure-sensitive element 13 returns to the normal measurement range, tension spring 38 returns lever 35 to a position of engagement with lever 27 through both fulcrums 36 and 37; and thereafter levers 35 and 27 of the lever system 26 rotate in unison and the differential pressure measurement continues in the manner described above. Thus, the operation of the overpressure valve 21 is automatic under overpressure conditions without interfering with the sensitive and delicate force measuring operation of the balance lever system 26 during normal pressure conditions in the range being measured.

While there has been shown and described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. A pressure-measuring device comprising:
    a hollow casing,
    a pair of flexible isolating diaphragms mounted in said casing and defining therewith a space adapted to contain a liquid,
    a rigid partition in said casing dividing said space into two chambers,
    a flexible pressure-sensitive element having one side exposed to the liquid pressure in one of said chambers and the other side connected to be exposed to the liquid pressure in the other of said chambers through a connecting conduit whereby said pressure-sensitive element is subjected to a force proportional to the difference in the liquid pressures in said chambers,
    a force balance system mounted in one of said chambers comprising a first lever pivotally mounted with respect to said casing for limited rotation with respect to a normal balanced position,
    a second lever pivotally mounted on said first lever,
    yielding means normally preventing pivotal movement of said second lever relative to said first lever so that said levers rotate in unison,
    means connecting said second lever to said pressure-sensitive element to apply a torque to said levers,
    balancing means for applying a counterbalancing torque to said first lever to maintain said levers in said normal balanced position when the force exerted on said levers by said pressure-sensitive element lies within a predetermined normal range of pressures, said yielding means being overpowered by said pressure-sensitive element during abnormal pressures to permit overpressure movement of said second lever and said pressure-sensitive element in either direction from their normal balanced position, and an overpressure valve actuated by said pressure-sensitive element for closing said conduit in response to overpressure movement of said pressure-sensitive element.

2. A pressure-measuring device as set forth in claim 1 wherein the balancing means comprises a force motor connected to the first lever and means including a position detector actuated by the first lever for controlling the force exerted on the first lever by the force motor.

3. A pressure-measuring device as set forth in claim 2 wherein the force motor is an electromagnetic motor producing a force proportional to the current supplied thereto and the position detector controls the magnitude of the current supplied to the force motor.

4. A pressure-measuring device as set forth in claim 3 wherein a load device is electrically connected in series-circuit relation with the force motor to provide an indication or control function variable in accordance with the differential of liquid pressure in the two chambers.

5. A pressure-measuring device comprising:
a hollow casing,
a pair of flexible isolating diaphragms mounted in said casing, the inside of said diaphragms defining with said casing a liquid-tight space adapted to contain a liquid,
means for subjecting the outside of said diaphragms to fluids the differential pressure of which is to be measured,
a rigid partition in said casing dividing said space into two chambers,
a flexible pressure-sensitive element having opposite sides thereof exposed to liquid pressures in said two chambers whereby said pressure-sensitive element is subjected to a force proportional to the difference in the liquid pressures in said chambers,
a force balance system for opposing and measuring the force exerted by said pressure-sensitive element comprising
pivotally mounted lever means,
a force motor,
means connecting said pressure-sensitive element and said force motor to said lever means so as to produce opposing torques thereon, and
a position detector actuated by said lever means for controlling the force exerted by said force motor so as to maintain said lever means in a state of balance,
said lever means, force motor, and position detector being entirely mounted in one of said chambers whereby the liquid therein acts to damp oscillations of said force balance system as well as transmit pressure to be measured to said pressure-sensitive element by hydraulic force.

6. A pressure-measuring device as set forth in claim 5 wherein the force motor is an electromagnetic motor producing a force proportional to the current supplied thereto and the position detector controls the magnitude of the current supplied to the force motor.

7. A pressure-measuring device as set forth in claim 6 wherein a load device located outside the casing is energized in accordance with the current supplied to the force motor.

8. A pressure-measuring device as set forth in claim 6 wherein shunt circuit means is provided to bypass a selected amount of current around the force motor to adjust the span of the pressure-measuring device.

9. A pressure-measuring device as set forth in claim 8 wherein the bypass means comprises a plurality of circuits connected in parallel with said force motor,
each circuit including a switch and a calibrated resistor whereby the span adjustment is effected by actuating selected switches in said circuits.

10. A pressure-measuring device as set forth in claim 9 wherein the resistance values of the calibrated resistors have a binary relationship to minimize the number of parallel circuits required to obtain the desired number of span adjustments.

11. A pressure-measuring device comprising:
a flexible pressure-sensitive element,
means for connecting said pressure-sensitive element to a fluid chamber so that it experiences a force tending to displace said pressure-sensitive element variable in accordance with the pressure of the fluid in said chamber,
a force-balancing system for opposing and measuring the force exerted by said pressure-sensitive element comprising
pivotally mounted lever means,
an electromagnetic force motor having an armature producing a force proportional to motor current,
means connecting said pressure-sensitive element and the armature of said force motor to said lever means so as to produce opposing torques thereon,
an energizing circuit for supplying current to said motor,
control means including a position detector actuated by said lever means for controlling the current flow in said motor-energizing circuit so as to maintain said lever means in a state of balance, and
a plurality of bypass circuits connected to bypass selected portions of the current flowing in said motor-energizing circuit around said motor, each of said circuits including a switch and a calibrated resistor whereby span adjustment of said pressure-measuring device may be effected by closing selected switches in said bypass circuits.

12. A pressure-measuring device as set forth in claim 11 wherein the resistance values of the calibrated resistors in the bypass circuits have a binary relationship to minimize the number of bypass circuits required to obtain the desired number of span adjustments.

References Cited

UNITED STATES PATENTS

| | | |
|---|---|---|
| 2,629,826 | 2/1953 | McIlvaine et al. |
| 2,659,390 | 11/1953 | MacLea et al. 92—1 |
| 2,686,893 | 8/1954 | Markson |
| 2,980,835 | 4/1961 | Williams 73—398 X |
| 3,158,001 | 11/1964 | Bauer et al. 60—54.5 |
| 3,225,600 | 12/1965 | Ziegler 73—407 |
| 3,274,833 | 9/1966 | Ollivier et al. 73—407 |

LOUIS R. PRINCE, *Primary Examiner.*

DONALD O. WOODIEL, *Assistant Examiner.*